United States Patent Office 2,989,266
Patented June 20, 1961

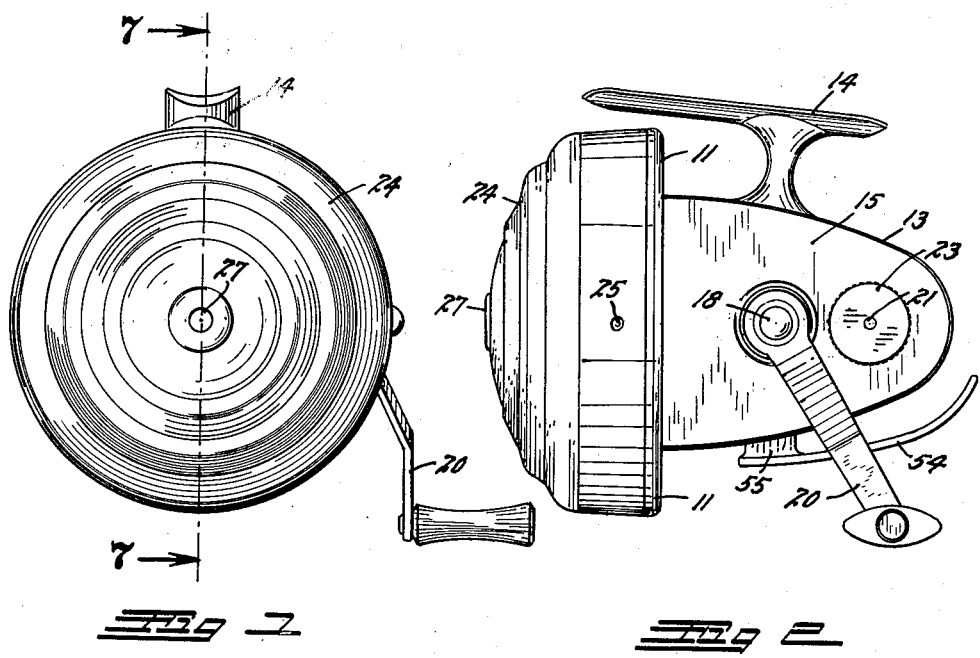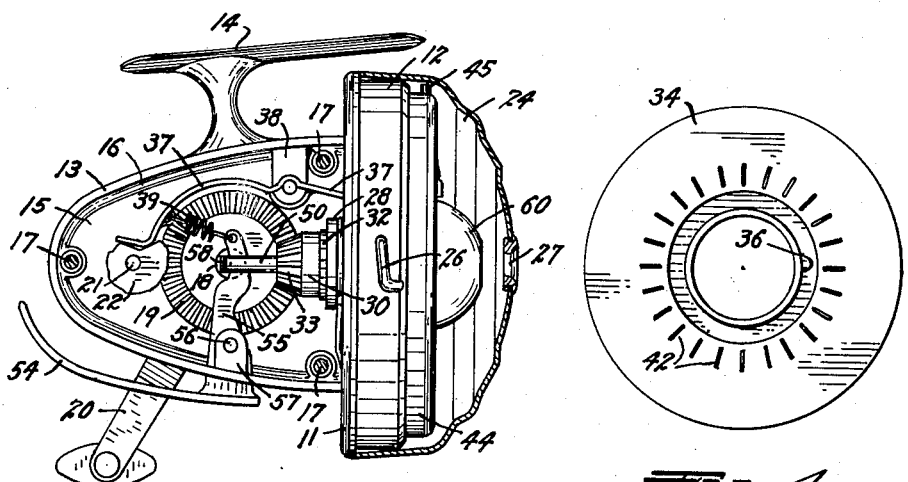

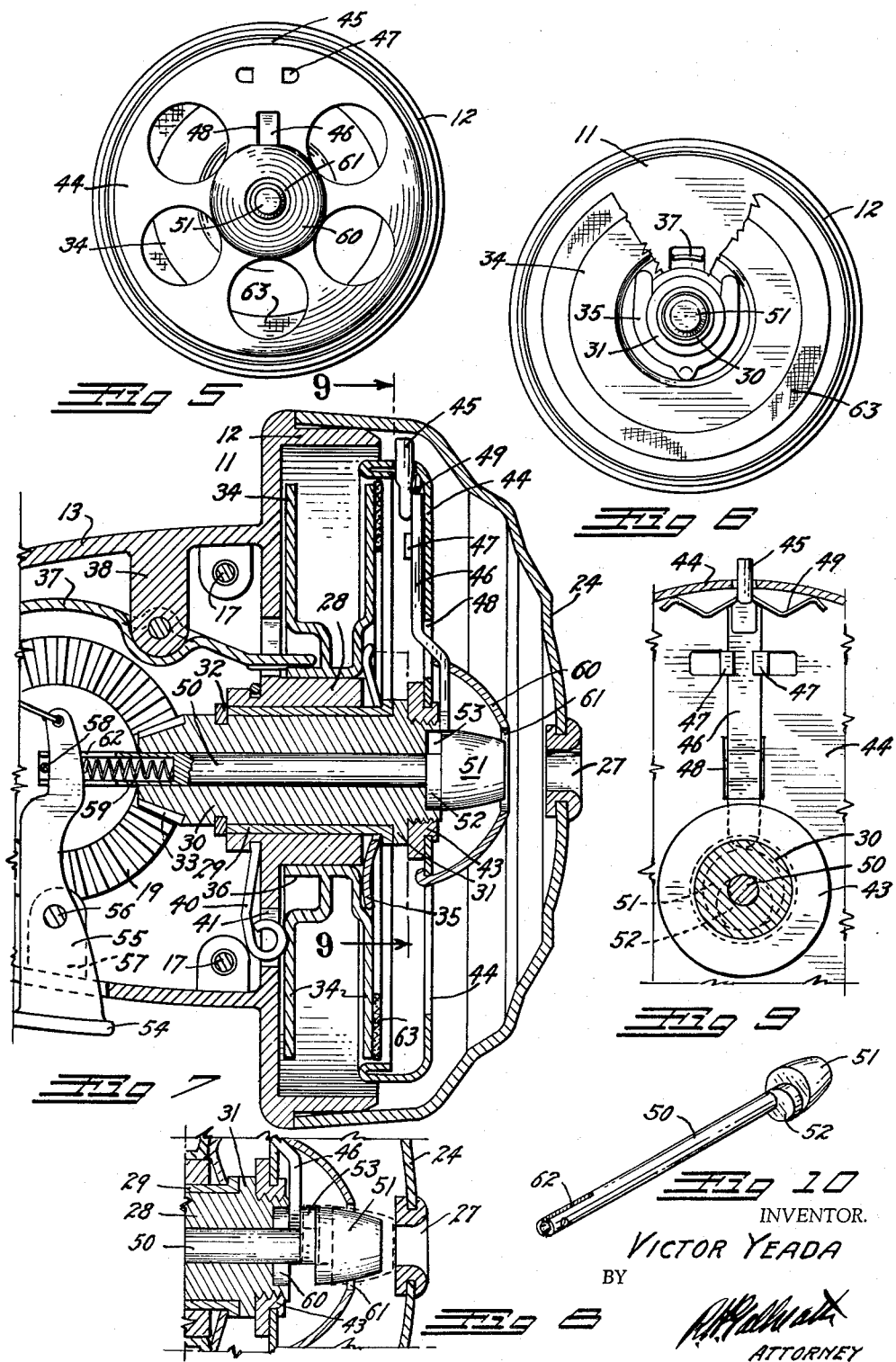

2,989,266
SPIN CASTING REEL
Victor Yeada, 4424 Vallejo St., Denver, Colo.
Filed Mar. 31, 1958, Ser. No. 725,013
1 Claim. (Cl. 242—84.2)

This invention relates to a fishing reel of the "spinning" variety and has for its principal object the provision of a highly, efficient reel of this character which will provide both complete freedom to line resistance for "casting," and accurate minutely-controllable resistance to line withdrawal for "playing" purposes.

Another object is to provide a spinning reel with highly efficient means for winding or retrieving the line which will automatically become operative upon rotation of a winding crank without any attention or adjustments on the part of the fisherman.

A further object is to so construct the improved reel that it will require a minimum of parts so that it can be economically manufactured and to provide means whereby various line spools can be quickly and easily replaced and interchanged while on the fishing location.

A still further object is to combine a line brake with which resistance may be applied to the outgoing line when the reel is in the "spinning" cycle with a brake which will apply a similar resistance when the line is in the winding or "retrieving" cycle so that either of the two braking means may be used independently of the other and to so construct the line brake that when used it will automatically convert the reel to the spinning cycle so the free control of the outgoing line is provided.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

FIG. 1 is a front view of the improved fishing reel;
FIG. 2 is a left side view thereof;
FIG. 3 is a right side view thereof with a side cover plate removed;
FIG. 4 is a detail view showing the rear face of a line spool employed in the improved reel;
FIG. 5 is a fragmentary front view of the improved reel with its front hood removed;
FIG. 6 is a similar front view with a flyer, to be later described, removed and with the line spool partially broken away to reveal what will be hereinafter known as a backing plate;
FIG. 7 is a fragmentary, enlarged, longitudinal section through the forward portion of the improved reel in the winding cycle, taken on the line 7—7, FIG. 1;
FIG. 8 is a fragmentary repetition of the control portion of the section of FIG. 7 illustrating the position of the elements of the improved reel in the winding or retrieving cycle;
FIG. 9 is a similarly enlarged, fragmentary, detail section, taken on the line 8—8, FIG. 7, illustrating the construction and mounting of a line winding pin employed in the reel; and
FIG. 10 is a detail perspective view of a plunger shaft element employed in the reel.

The reel mechanism is mounted in and supported by a unitary die casting shaped to form a circular backing plate 11 having an annular forwardly-projecting hood-receiving flange 12 on its forward face; a hollow, open-sided, D-shaped housing 13 projecting medially rearward from its rear face; and a reel foot 14, for attaching the reel to a fishing rod, formed integrally with the housing 13. The open sides of the D-shaped housing 13 are closed by means of a crank plate 15 and a cover plate, not shown.

The crank plate 15 and the cover plate correspond in shape to the shape of the housing and are provided with aligning ridges 16 which fit within and align them with the housing. The plates are clamped to the housing by means of suitable clamp screws 17 which pass through the cover plate and are threaded into threaded sockets in the crank plate. The cover plate is plain. The crank plate, however, is provided with a crank shaft 18 terminating at its inner extremity in a bevel gear 19 and at its outer extremity in a hand crank 20. The crank plate is also provided with a cam shaft 21 terminating at its inner extremity in a brake cam 22 and at its outer extremity in a knurled finger button 23. As illustrated, the crank plate 15 is positioned on the left side of the housing 13. The crank and cover plates, however, are interchangeable so that the reel can be assembled either right or left handed.

The bell-shaped hood 24 is removably fitted over the hood flange 12 and secured in place in any desired manner such as by means of indentations 25 in the hood entering bayonet slots 26 in the flange 12. A line grommet 27 is positioned at the exact center of the hood 24.

A tubular bearing sleeve 28 is cast or otherwise formed at the exact center of the backing plate 11 so as to project both forwardly and rearwardly therefrom, and a bearing bushing 29 is pressed-fitted therein. A trunnion shaft 30 is rotatably mounted in the bearing bushing 29 and prevented from moving longitudinally therein by means of a forward retaining flange 31 formed therein and a rear snap ring 32 inset therein. Pinion teeth 33 are formed on the rear extremity of the trunnion shaft 30. These teeth are in constant mesh with the teeth of the bevel gear 19 so that rotation of the crank 20 imparts a multiplied rotation to the trunnion shaft 30.

A line spool 34 is rotatably mounted on the bearing sleeve 28 and is retained in place thereon by means of a resilient U-shaped key 35 which is slidably inserted around the forward extremity of the bearing bushing 29 behind the retaining flange 31 so as to resiliently engage the line spool 34 at its extremities. The mid-portion of the forward face of the line spool is depressed as illustrated so as to retain the key 35 in place.

The rear face of the line spool is also depressed to expose a hub braking surface 36 on the spool against which the forward extremity of a resilient braking lever 37 may be brought to bear for resisting rotation of the line spool. The braking lever 37 is tiltably mounted in a mounting bracket 38 in the housing 13 and is constantly urged at its rear extremity against the brake cam 22 by means of a tension spring 39. Thus, rotation of the finger button 23 flexes the brake lever to apply controlled braking pressure on the hub braking surface 36 of the line spool to resist rotation thereof.

A wire click spring 40 is mounted on the rearwardly extending portion of the bearing sleeve 28 and extends first radially thence forwardly through an opening 41 in the backing plate 11 into contact with the rear face of the line spool. The latter rear face is provided with an annular series of radially-extending clicking indentations 42 which produce a clicking sound as they pass the click spring 40 to inform the fisherman that the line spool is rotating.

The extremity of the trunnion shaft 30 forwardly of the retaining flange 31 is threaded and a hub 43, which is fixedly mounted in a flyer 44, is threaded thereon against the flange 31. The cup-shaped rim of the flyer 44 extends rearwardly about and partially over the line spool 34. A withdrawable line winding pin 45 protrudes radially from the rim of the flyer 44. The pin 45 is mounted on the outer extremity of a radially positioned, longitudinally-slidable cam follower bar 46 which is held in slidable engagement with the rear face of the flyer by means of suitable guide ears 47 and which extends forwardly to the front face of the flyer through a guide opening 48 therein thence inwardly toward the flyer axis. The follower bar 46 is constantly urged radially inward by means of a resilient spring wire 49 resiliently positioned between the outer extremity of the rod and the inner surface of the rim of the flyer as shown in FIG. 9.

A plunger shaft 50 extends axially through the trunnion shaft and is longitudinally movable therein. The plunger shaft 50 terminates at its forward extremity in a line-gripping head 51 on the rear extremity of which an eccentric cam 52 is formed. The size and eccentricity of the cam 52 is such that, at one side, it is tangent to the surface of the plunger shaft 50 and at the opposite side it is tangent to and flush with the cylindrical surface of the head. When the plunger shaft 50 is in the retracted position, the eccentric cam 52 is contained within a circular cam socket 53 in the forward extremity of the trunnion shaft 30, as shown in FIG. 7.

The plunger shaft can be forced forwardly when desired by means of a thumb lever 54 which extends rearwardly from the outer extremity of an actuating lever 55 which is pivoted at 56 in a pivot lug 57 formed in the housing 13. The inner extremity of the actuating lever extends through a longitudinally elongated slot in the rear extremity of the plunger shaft 50 and is retained in the slot by means of a suitable transversally-extending cotter key 58. The plunger shaft 50 is resiliently urged forwardly by means of a cushioning compression spring 59 inset in the rear extremity of the plunger shaft.

The tension spring 39 is connected to the upper extremity of the actuating lever and acts to constantly urge the thumb lever 54 away from the housing and to urge the plunger shaft 50 rearwardly. A protecting dome 60 is concentrically mounted on the flyer about the head 51 of the plunger shaft 50. The dome 60 is provided with an axial opening through which the head may be projected into contact with the line grommet 27.

Operation

Let us assume that the reel is mounted on a fishing rod and that a fishing line is reeled upon the line spool 34 and extends over the rim of the flyer 44, through the grommet 27, and thence through the line guides of the pole to the hooks, lures or bait. Now let us assume it is desired to make a cast, the rod is swung upwardly and forwardly and, at the proper release point in the arc of swing, the thumb lever 54 is depressed. This moves the plunger shaft forwardly from the path of the cam follower bar allowing the spring wire 49 to snap the bar inwardly to the plunger shaft rearward of the head 51 and rearward of the cam 52 as shown in FIG. 8. This instantly withdraws the winding pin 45 and allows the line to spin about the periphery of the flyer so as to unreel itself without resistance of any kind.

Now let us assume it is desired to stop or retard the rapidly travelling line. It is only necessary to further depress the thumb lever 54 to force the head 51 further forward until it grips the line against the grommet 27, as shown in broken line in FIG. 8, until the desired retardation is obtained.

It is desired to call attention to the fact that the plunger shaft 50 is "spring loaded" by the cushioning spring 59 so that the gripping pressure against the line can never exceed the compression bias of the spring so that damage to the line is eliminated.

To retrieve the line, it is only necessary to rotate the hand crank in the winding direction to rotate the flyer 44. The first rotative movement of the flyer (180° or less) will bring the low point of the eccentric cam 52 into alignment with the cam follower bar 46 so that the plunger rod can snap rearwardly to bring the cam into alignment with the follower rod. Further rotation (180° or less) of the flyer will cause the follower rod to climb the eccentric cam until it reaches the high point thereof in alignment with the surface of the head. This allows the plunger shaft to snap further rearward so that the cam will enter its cam socket 53 and the follower rod will ride on the head 51 with the winding pin projected as shown in FIG. 7.

Further rotation of the crank will cause the winding pin to wind the line on the line spool. Should it be desired to "play" a fish and allow the line to be withdrawn under controlled resistance, it is only necessary to allow the reel to remain in the "retrieve" cycle and adjust the brake finger button 23.

The protecting dome 60, concentrically mounted on the forward face of the flyer 44, encloses the plunger head 51 when the latter is in the retrieve or winding position so as to prevent entanglement of the line with the head. The head is provided with an axial passage 61 to allow the head to be protruded for the spinning cycle. An annular felt pad 63 is cemented or otherwise secured on the forward face of the line spool 34 to provide a finger gripping area to facilitate placement of the reel. The fibrous edge of the felt pad also projects slightly beyond the periphery of the spool so as to resist the entry of the line between the spool and the rim of the flyer and make it unnecessary to fit the spool and the rim to close tolerances.

It will be noted that the head is tapered to a smaller diameter at its forward extremity so as to provide a wedge shape which will act to force the cam follower bar radially outward against the bias of the spring wire 49 as the flyer is assembled into position.

While a specific form of the improvement has been described and illustrated herein, it is to be understood that the same may be varied within the scope of the appended claim without departing from the spirit of the invention.

Having thus described the invention, what is claimed and desired secured by Letters Patent is:

A fishing reel including a housing; a backing plate in said housing; a bearing sleeve projecting axially forward from said plate; a line spool mounted on said bearing sleeve; a trunnion shaft rotatable in said bearing sleeve; hand operated crank means for rotating said trunnion shaft; a cup shaped flyer mounted on said trunnion shaft forwardly of said line spool and extending rearwardly over said line spool; a plunger shaft axially reciprocal in said trunnion shaft, said plunger shaft having a longitudinally elongated slot in the rear end thereof; a cushioning spring inset in the rear end of said plunger shaft, a thumb actuated lever extending into said slot; means retaining said lever in said slot; one end of said cushioning spring bearing against said lever; a braking lever tiltably mounted in said housing; a brake cam engaged by said braking lever, a tension spring connected between said braking lever and said thumb actuated lever biasing said braking lever into engagement with said brake cam and urging said thumb lever rearwardly; a conical head on the forward end of said plunger shaft; a withdrawable winding pin protruding radially from the peripheral surface of said flyer; a cam follower bar connected to said winding pin and slidably mounted for radial movement on said flyer, resilient means urging said bar radially inwardly into contact with said conical head; a cam on said plunger shaft rearwardly of said conical head; said thumb actuated lever engaging said cushioning spring to urge said plunger shaft and hence said conical head forwardly to allow said resilient means to snap said bar inwardly behind the head to retract said winding pin from its projected line winding position, said last mentioned cam serving to return said pin to projected position upon rotation of said flyer; a head having a line grommet therein positioned on said housing about said flyer; a line on said line spool extending through said grommet, said conical head snubbing said line at said grommet when projected forwardly by said thumb engaged bar.

References Cited in the file of this patent

UNITED STATES PATENTS

| | | |
|---|---|---|
| 1,639,174 | Von Soden-Fraunhofen | Aug. 16, 1927 |
| 2,587,257 | Weisblatt | Feb. 26, 1952 |
| 2,644,647 | Denison et al. | July 7, 1953 |
| 2,668,025 | Hull | Feb. 2, 1954 |
| 2,772,839 | Morton | Dec. 4, 1956 |
| 2,903,201 | Sarah | Sept. 8, 1959 |
| 2,903,202 | Sarah | Sept. 8, 1959 |